United States Patent [19]

Dressler

[11] 4,347,104

[45] Aug. 31, 1982

[54] MOISTURE-INSENSITIVE ELECTRICALLY-CONDUCTIVE PAPER

[75] Inventor: Daryl D. Dressler, St. Paul, Minn.

[73] Assignee: Minnesota Mining and Manufacturing Company, Saint Paul, Minn.

[21] Appl. No.: 40,417

[22] Filed: May 18, 1979

[51] Int. Cl.³ .............................................. D21H 1/02
[52] U.S. Cl. .................................... 162/103; 162/138; 162/146; 428/408
[58] Field of Search ............... 162/103, 138, 141, 146; 428/408, 910; 338/250, 255; 219/528, 544, 549

[56] References Cited

U.S. PATENT DOCUMENTS

| | | | |
|---|---|---|---|
| 3,265,557 | 8/1966 | DeFries et al. | 162/138 |
| 3,367,851 | 2/1968 | Filreis et al. | 162/138 |
| 3,774,299 | 11/1973 | Sato et al. | 338/255 |
| 3,998,689 | 12/1976 | Kitago et al. | 162/146 |

*Primary Examiner*—Peter Chin

[57] ABSTRACT

Electrically-conductive paper comprising a mixture of electrically-conductive fibers, wood pulp and synthetic wood pulp, the ratio between the two types of pulp being so selected that the electrical conductivity of the paper does not change appreciably with changes in ambient moisture. The conductive paper may be encapsulated within an electrically-insulating moisture barrier.

6 Claims, No Drawings

MOISTURE-INSENSITIVE ELECTRICALLY-CONDUCTIVE PAPER

BACKGROUND TO THE INVENTION

U.S. Pat. No. 3,367,851 (Filreis et al.) discloses an electrically-conductive paper which is capable of uniform heat generation over a large area. The paper may comprise 2-35% by weight of electrically conductive carbonaceous fibers, and the balance may be wood pulp or asbestos of paper making grade. Such a paper provides inexpensive heating panels and food warming trays. Although not mentioned in the patent, the electrical conductivity of the paper decreases with increased moisture content. It is theorized that the moisture causes the paper to swell, thus tending to break the paths of electrical conductivity through the carbonaceous fibers.

To protect it from moisture, a conductive paper may be encapsulated within an electrically-insulating moisture barrier while keeping the moisture content of the paper at a controlled low level. Especially useful in this respect is a laminate of biaxially-oriented polyethylene terephthalate film and polyethylene film. The polyethylene faces of two pieces of the laminate are bonded to the electrically conductive paper and to each other beyond the perimeter of the paper, as shown in U.S. Pat. No. 3,774,299 (Sato et al.). Because that laminate is only partially resistant to water-vapor transmission, changes in ambient humidity can eventually produce changes in the moisture content of the paper, with corresponding changes in its electrical conductivity. The water-vapor transmission has been reduced nearly to zero by covering the electrically-insulating moisture barrier with metal foil, but this has significantly increased the complexity of the manufacturing process and also the cost of raw materials.

The Sato patent suggests that the electrically-conductive paper may be made from either "natural or synthetic fibers such as cellulosic fibers, polyvinyl alcohol fibers, polyamide fibers, acrylic fibers, . . . " etc. Col. 3, lines 10-17). U.S. Pat. No. 3,265,667 (DeFries et al.) concerns a similar conductive paper using "any desirable mixture of fibers either synthetic or natural, organic or inorganic . . . " (col. 2, lines 67-69), but without suggesting any specific mixture.

Currently the most economical synthetic fibers for making paper are made by treating polyolefin fibers to make them readily dispersible in water. The following U.S. Pat. Nos. assigned to Crown Zellerbach Corporation disclose various processes: 3,743,570; 3,787,256; 3,848,027 and 3,891,499. Such treated, water dispersible polyolefins are known as "synthetic wood pulp", hereinafter called "SWP". Crown Zellerbach currently sells SWP in several commercial grades such as E-400, E-600, etc.

The aforementioned patents are silent as to the effect upon electrical conductivity of changing from natural fibers such as wood pulp to synthetic fibers such as SWP. However, it would be expected that an electrically-conductive paper made from SWP, which absorbs very little moisture, would experience virtually no swelling or shrinkage with changes in ambient humidity. Hence, one would expect its electrical conductivity to remain approximately constant at all levels of ambient humidity.

The inventor is not aware of any electrically-conductive paper on the market based on a synthetic fiber. When the inventor made such a paper in the laboratory from SWP, it surprisingly exhibited significantly increased electrical conductivity with increases in ambient humidity.

The Present Invention

The present invention provides a novel electrically-conductive paper which can experience very little change in electrical conductivity with changes in humidity. Essentially the novel paper comprises a mixture of SWP and wood pulp of paper-making grade plus electrically-conductive carbonaceous fibers in an amount of from 1% to 35% of the weight of the paper. As disclosed in the Filreis patent, the carbonaceous fibers should have a carbon content of at least 80% by weight, short lengths [preferably an average fiber length from about 1/16 to about 7/16 inch (0.15–1.1 cm)] and small average diameter [preferably an average denier of from 0.25 to 5].

The novel electrically-conductive paper may be used without any sort of encapsulation but may be encapsulated if it is desired to insulate the paper electrically. Depending upon the water-vapor-transmission characteristics of the encapsulating material, it is desirable to adjust the proportion of SWP to wood pulp in order to minimize any change in electrical conductivity with changes in ambient humidity.

When the novel conductive paper is not encapsulated, it should comprise a mixture of 2-30 parts by weight of wood pulp and correspondingly 98-70 parts by weight of SWP. When the ratio of SWP to wood pulp in the unencapsulated paper exceeds about 25:1, its electrical conductivity tends to increase with increased humidity. When that ratio is below 8:1, the electrical conductivity tends to decrease with increased humidity. At intermediate ratios, there can be very little change in electrical conductivity with changes in humidity. In order to keep the changes in electrical conductivity to a minimum with changes in humidity, the unencapsulated conductive paper should have an SWP/wood pulp ratio of at least 4:1 and not more than 50:1, preferably about 12:1 to 20:1.

When the novel electrically-conductive paper is encapsulated within a moisture barrier, the proportion of SWP to wood pulp should be decreased according to the effectiveness of the barrier in order to keep changes in electrical conductivity to a minimum. However, there is little need for any such adjustment to compensate for changes in the effectiveness of the barrier if it transmits less than about 0.1 gram of water per 100 square inches per 24 hours [1.5 g/m$^2$/24 hours] at 100° F. [38° C.] and 95% relative humidity. If the barrier transmits less than one gram of water per 100 square inches [15 g/m$^2$/24 hours], the SWP/wood pulp ratio should be at least 1:1 and not more than 9:1. If the barrier transmits about 0.25 gram of water under such conditions, the SWP/wood pulp ratio is preferably about 7:3.

Preparation of Electrically Conductive Paper

For ease of manufacturing an electrically-conductive paper on a commercial scale, a good basic weight is 50 pounds per ream [85 g/m$^2$]. A typical requirement for specific electrical resistance is 27 ohms per square. In order to make electrically-conductive paper having such basis weight and specific electrical resistance on a laboratory basis, add 2.083 g of SWP (Crown Zellerbach E-400) to 400-500 ml water and disperse in a blender at high speed for one minute. Add 0.893 g of bleached kraft softwood pulp and operate the blender for ten seconds; then add 0.525 g of carbon fibers and operate the blender for an additional ten seconds. Pour the dispersion into a hand-sheet mold fixture previously partially filled with water and add sufficient water to fill the fixture. Stir by hand with a comb-like paddle until the fibers are uniformly dispersed and then drain the water. Remove the hand-sheet formed on the fixture's screen and dry in a paper dryer to provide an electrically-conductive paper.

To make test samples of a suitable size, cut the dried sheets into rectangles 3.5×4.5 inches (8.9×11.4 cm). Using a heated-platen press, adhere a 2-ounce (68 -micrometers-thick) copper foil, 0.5 inch (1.3 cm) in width along each of the 3.5-inch (8.9-cm) edges using a conductive thermoplastic adhesive. Thus there is a 3.5-inch-square (8.9-cm-square) area between the copper-foil electrodes. By applying a temperature of 150°–175° C. and a pressure of 35–100 psi (240–690 kPa), the heated-platen press also fuses the SWP fibers of the SWP-containing conductive papers to produce an integral, semi-transparent, film-like structure. The same press conditions are suitable for then encapsulating the conductive papers within a laminate of polyethylene film and polyethylene terephthalate film.

Testing

A number of encapsulated and unencapsulated electrically-conductive papers were prepared as described above except at various ratios of SWP to wood pulp and with encapsulating laminates providing various degrees of resistance to water-vapor transmission as indicated in the table below. The barrier with the greatest resistance included a vapor-deposited aluminum film. These encapsulated and unencapsulated electrically-conductive papers were tested for changes in electrical resistance, first by testing in air at ordinary room temperature and 45% relative humidity and then retesting following 96-hour exposure to salt spray [ASTM B-117-73]. The percent changes in resistance, averaged from a large number of samples in each case, are reported in the table.

|  | Ratio of SWP to Wood Pulp | Water-Vapor Transmission of Envelope (g/m$^2$/24 hr) | % Change in Electrical Resistance |
|---|---|---|---|
| Sample 1 | 50:50 | 10.9 | 6.4 |
| Sample 2 | 70:30 | " | 0.06 |
| Sample 3 | 90:10 | " | −2.2 |
| Sample 4 | 50:50 | 3.9 | 4.4 |
| Sample 5 | 70:30 | " | 0.14 |
| Sample 6 | 90:10 | " | −4.5 |
| Sample 7 | 100:0 | " | −10.7 |
| Sample 8 | 50:50 | 0.3 | 1.2 |
| Sample 9 | 70:30 | " | 0.39 |
| Sample 10 | 90:10 | " | −0.78 |
| Sample 11 | 50:50 | Unencapsulated | 27.3 |
| Sample 12 | 70:30 | " | 4.9 |
| Sample 13 | 90:10 | " | 2.6 |
| Sample 14 | 100:0 | " | −7.4 |

The electrically-conductive papers of the foregoing samples consisted only of mixtures of carbonaceous fibers and either SWP or SWP and wood pulp. However, other materials may be additionally incorporated into the novel conductive paper, as is known in the art, e.g., glass, asbestos or other inorganic fibers, various polymeric fibers, mica flakes and carbon particles in such quantities as do not interfere with the attainment of a desired value of electrical conductivity or render the paper unduly sensitive to changes in humidity. By the same token, the novel conductive paper may be impregnated with nonconductive resins such as phenolic and epoxy resins which can afford added strength and integrity without interfering with the desired unchanging electrical conductivity over the full area of a piece of the novel conductive paper. However, to the extent that such impregnating is a barrier to water vapor, the proportion of SWP to wood pulp should be adjusted as indicated by the data reported for the examples.

An experimental use for the electrically-conductive paper of the invention is to heat liquid crystal displays which are used outdoors (e.g., on gasoline pumps). If those displays are to be back-lighted, the paper should be reasonably translucent. Since higher proportions of SWP to wood pulp have better translucency, it is preferred for such use that the SWP/wood pulp ratio be at least 2:1.

I claim:

1. Electrically-conductive paper which has little change in electrical conductivity with changes in humidity and comprises
   (1) 2–50 parts by weight of wood pulp,
   (2) correspondingly 98–50 parts by weight of water-dispersible synthetic wood pulp (SWP),
   (3) electrically conductive carbonaceous fibers comprising at least 80% carbon by weight and in an amount providing 1–35% by weight of the paper, the SWP/wood pulp ratio being at least 4:1 when the paper is unencapsulated and at most 9:1 when the paper is encapsulated in an envelope which transmits less than one gram of water per 100 square inches per 24 hours at 100° F. and 95% relative humidity.

2. Electrically-conductive paper as defined in claim 1 which is unencapsulated and the SWP/wood pulp ratio is 12:1 to 20:1.

3. Electrically-conductive paper as defined in claim 1 which is encapsulated within a moisture barrier which transmits less than one gram of water per 100 square inches per 24 hours at 100° F. and 95% relative humidity and the SWP/wood pulp ratio is 1:1 to 9:1.

4. Electrically-conductive paper as defined in claim 3 which is encapsulated between two pieces of a laminate of biaxially-oriented polyethylene terephthalate film and polyethylene film, the polyethylene layers being fused to the paper and to each other beyond the edges of the paper.

5. Electrically-conductive paper as defined in claim 1 which is unencapsulated and the SWP/wood pulp ratio is between 4:1 and 49:1.

6. Electrically-conductive paper as defined in claim 3 wherein said moisture barrier transmits about 0.25 gram of water per 100 square inches per 24 hours at 100° F. and 95% relative humidity and the SWP/wood pulp ratio is about 70:30.

* * * * *